United States Patent

[11] 3,621,863

| [72] | Inventor | Douglas Alan Caine<br>Moseley, England |
|---|---|---|
| [21] | Appl. No. | 783,968 |
| [22] | Filed | Dec. 16, 1968 |
| [45] | Patented | Nov. 23, 1971 |
| [73] | Assignee | Joseph Lucas (Industries) Limited<br>Birmingham, England |
| [32] | Priority | Feb. 1, 1968 |
| [33] | | Great Britain |
| [31] | | 5,136/68 |

[54] VALVES
2 Claims, 2 Drawing Figs.

[52] U.S. Cl. ........................................... 137/83,
251/129
[51] Int. Cl. .......................................... F16k 31/06
[50] Field of Search ........................................... 251/129,
298, 299; 137/83

[56] References Cited
UNITED STATES PATENTS

| 2,064,935 | 12/1936 | McFall et al. | 251/129 X |
| 3,414,231 | 12/1968 | Krenter | 251/282 X |

FOREIGN PATENTS

| 508,031 | 12/1954 | Canada | 251/65 |

*Primary Examiner*—Arnold Rosenthal
*Attorney*—Holman & Stern

ABSTRACT: A valve comprising a body having an inlet for fluid, a member movable relatively to the inlet to control flow therethrough, operating means acting on one end of the member and a pair of expandable support members connected to the ends of the member and by which it is solely supported, the support members being disposed at an acute angle with respect to one another to control movement of the member under the action of the operating means about an arc.

PATENTED NOV 23 1971        3,621,863
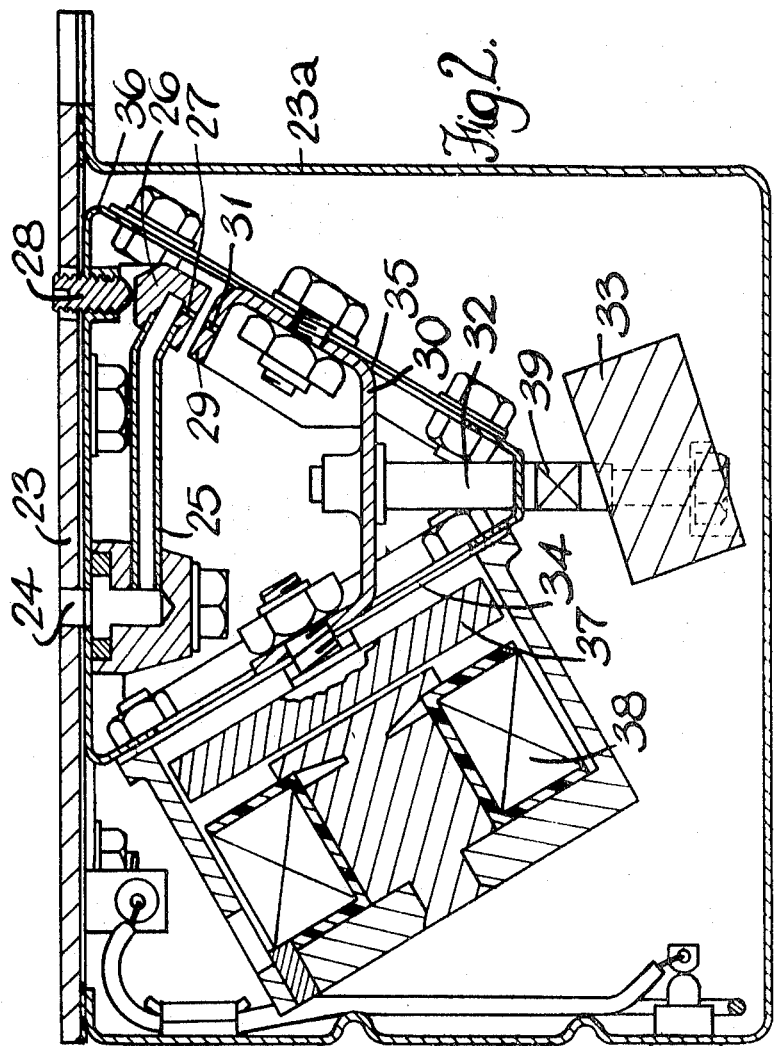
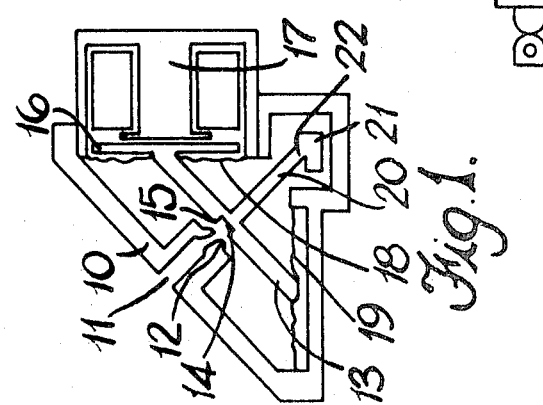
INVENTOR
Douglas Alan Caine,
BY Holman, Glascock
   Downing & Siebold
ATTORNEYS

VALVES

BACKGROUND OF THE INVENTION

This invention relates to valves of the kind in which there is a fluid inlet passage and a member arranged, upon actuation of the valve, to interrupt or disturb the linear emission of fluid through the inlet passage.

In valves of this type, the movement of the member is often small, being frequently of the order of 0.010 inches only, so that it is difficult to control accurately.

The object of the invention is to provide a valve of the kind specified in which the accurate control of the member can be accomplished.

SUMMARY OF THE INVENTION

In accordance with the present invention, a valve comprises a body having an inlet for fluid to be controlled, a member movable relatively to the inlet, so that a portion thereof controls the flow therethrough, operating means acting upon one end of the member, expandable support members connected to the ends of the member respectively and by means of which it is solely supported, the support members being arranged at an acute angle with respect to each other, so that the member moves, under the action of the operating means, about an arc.

The invention will now be described by way of example with reference to the accompanying drawings, in which:

BRIEF DESCRIPTION OF THE DRAWINGS

FIG. 1 is a diagrammatic representation of a valve constructed in accordance with the invention, and FIG. 2 is a cross-sectional view of an alternative form of valve.

DETAILED DESCRIPTION OF THE INVENTION

With reference to FIG. 1, there is provided a valve which comprises a body 10 of generally triangular cross section and having at the approximate center of one side, an inlet 11 for fluid to be controlled. This inlet terminates in an inclined passageway 12, directed towards a member 13 mounted within the body 10.

The member 13 has a slot 14, one side of which defines a knife edge 15, which upon movement of the member 13, as will be described, can control the direction of flow of fluid through the inlet 11.

The member 13 has connected to it a plate 16, serving as the armature of an electrical solenoid 17, whereby the member 13 can be moved.

In order to support the member 13 in the body 10, there are two flexible and elastic diaphragms 18, 19 connected to the ends of the member 13 respectively. The ends of the member 13 are connected to the central regions of the diaphragms 18 and 19 respectively, with the former diaphragm being connected adjacent to the plate 16.

The member 13 has an extension 20 connected to its midregion directed away from the inlet 11, and the free end of this extension carries a counter balance weight 21.

In use, in the position shown, the member 13 does not, to any substantial extent, interfere with the flow of fluid through the inlet 11 into the interior of the body 10, but when the solenoid 17 is actuated, the member 13 is constrained to move through an arc until the knife edge 15 interferes with the flow of fluid through the inlet 11, with the suspension members in the form of diaphragms 18 and 19 serving to guide the member about said arc, the center of which corresponds approximately with a point indicated at 22.

The force required to cause interference of the knife edge 15 with the flow of the fluid through the inlet can be minimized by suitably shaping the inlet passage and also the knife edge. This therefore minimizes the electrical power required to operate the device.

In the alternative example shown in FIG. 2, there is a support plate 23 upon which is mounted a detachable casing 23a. Through the plate 23 extends an inlet passage 24. The inlet passage 24 communicates with the interior of a resilient metal tube 25. At the end of the tube 25 is a block 26 in which is formed a passage 27 corresponding to the passage 12 in FIG. 1.

In the support plate 23 is an adjusting screw 28 acting against the block 26 which can be moved to adjust the position of the block 26 by flexure of the tube 25, the resilience of the tube 25 tending to urge the block 26 into contact with the screw 28. Adjustment takes place in a direction towards and away from a flange 29 on a member 30 in a direction which is normal to the adjacent surface of the flange. In the flange 29 of the member 30 is formed a hole 31. The valve which is comprised by the flange 29 with the hole 31 and the block 26, with the passage 27 is the subject of our copending British Pat. Application No. 55726/67.

The member 30 is formed from sheet metal and the flange 29 is formed at one end. It has two portions inclined to one another at an angle of 60° and the flange 29 is formed at the remote end of one of these portions. Joining these two portions is and intermediate portion to which is connected a pair of rods 32. The rods 32 carry, at their other ends, a balance weight 33.

The member 30 is carried by a pair of circular metal apertured and corrugated diaphragms 34, 35 connected at their midregions to mutually inclined portions of the member 30, the edges of the diaphragms being mounted upon a structure 36 carried by the support plate 23. These diaphragms are arranged with their faces inclined at 60° to each other. At the center of the diaphragm 34, there is an armature 37 of an electrical solenoid 38. The body of the solenoid 38 is mounted upon the structure 36. The diaphragms are intended to resist movement in the direction of their planes but permit some axial movement.

When the solenoid 38 is energized, the member 30 is constrained to move through an arc, the center of which corresponds approximately with the position indicated at 39, and one edge of the hole 31 serves as a knife edge to control the flow of fluid from the inlet 24 through the tube 25 and the passage 27. It is to be understood that the magnitude of the movement is extremely small, and may, in this example, be in the range of 0.010 inches only, with the degree of control being dependent upon the electrical power supplied to the solenoid 38.

The balanced forms of the valve shown, having weights 21, or 33 respectively, balancing the members 13 and 30 respectively, enables the device to remain substantially unaffected by external forces such as vibration or acceleration of the equipment to which the device is attached. This independence of external forces is achieved, moreover without the use of pivots. Pivots, tend, in use, to suffer from the disadvantage of impairing the accurate control of the device by introducing static friction.

I claim:

1. A valve comprising a body having an inlet for fluid to be controlled, a member within the body provided with two portions inclined to one another at an angle of about 60°, an intermediate portion connecting the inclined portions and a further portion for controlling the flow through the inlet, a diaphragm connected to each inclined portion and to the body by means of which said member is solely supported, the diaphragms being arranged with their faces inclined at approximately 60° to each other whereby the diaphragms resist movement in the direction of their planes but allow some axial movement, and operating means operably connected with one of said inclined portions of said member, operative upon actuation thereof, to move said member about an arc guided by said diaphragms until said portion controlling the flow through the inlet interferes with the flow through the inlet, said operating means being an electrical solenoid mounted within and secured to the body, and said solenoid having an armature connected to the diaphragm of said one inclined portion.

2. A valve comprising a body having an inlet for fluid to be controlled, a member within the body provided with two portions inclined to one another at an angle of about 60°, an intermediate portion connecting the inclined portions and a further portion for controlling the flow through the inlet, a diaphragm connected to each inclined portion and to the body by means of which said member is solely supported, the diaphragms being arranged with their faces inclined at approximately 60° to each other whereby the diaphragms resist movement in the direction of their planes but allow some axial movement, and operating means operably connected with one of said inclined portions of said member, operative upon actuation thereof, to move said member about an arc guided by said diaphragms until said portion controlling the flow through the inlet interferes with the flow through the inlet, a balance weight, and means connecting the balance weight to substantially the midpoint of the intermediate portion of said member on the side thereof directed away from said inlet to enable the valve to remain substantially unaffected by external forces connected to said member.

* * * * *